(12) United States Patent
Gugaliya et al.

(10) Patent No.: US 8,055,562 B2
(45) Date of Patent: Nov. 8, 2011

(54) COMPUTER EVALUATION OF CROP RELATED INDUSTRIES

(75) Inventors: Jinendra K. Gugaliya, Karnataka (IN);
Mangesh D. Kapadi, Karnataka (IN);
Gudi Ravindra, Karnataka (IN);
Jagadeesh Brahmajosyula, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 189 days.

(21) Appl. No.: 12/146,100

(22) Filed: Jun. 25, 2008

(65) Prior Publication Data

US 2009/0326896 A1    Dec. 31, 2009

(51) Int. Cl.
*G06Q 40/00*    (2006.01)
(52) U.S. Cl. ............................................ 705/35; 705/30
(58) Field of Classification Search ............... 705/10–44
See application file for complete search history.

(56) References Cited

U.S. PATENT DOCUMENTS

| | | | | |
|---|---|---|---|---|
| 3,703,630 | A * | 11/1972 | Gelder | 705/7 |
| 5,630,070 | A * | 5/1997 | Dietrich et al. | 705/8 |
| 6,988,076 | B2 * | 1/2006 | Ouimet | 705/7 |
| 7,047,133 | B1 * | 5/2006 | Dyer et al. | 702/5 |
| 7,657,469 | B1 * | 2/2010 | Yegge et al. | 705/30 |
| 2002/0188459 | A1 * | 12/2002 | Erickson | 705/1 |
| 2007/0239624 | A1 * | 10/2007 | Vernon | 705/80 |
| 2008/0035036 | A1 * | 2/2008 | Bassani et al. | 110/224 |

OTHER PUBLICATIONS

Sergio C. Trindale, "Global Biofuels Trade", SET International, Ltd., 1A Dickel Road, Scarsdale, NY 10583-2117, USA, Strindale@alum.mit.edu. year 2005.*
Kara Laney, Biofuels : Promises and Constraints, International Food & Agricultural Trade Policy Council, IPC Discussion Paper, Dec. 2006.*
D. Krajnc et al., "Improving the Economic and Environmental Performances of the Beet Sugar Industry in Slovenia: Increasing Fuel Efficiency and Using By-Products for Ethanol", ScienceDirect, Journal of Cleaner Production, 2006, pp. 1-13.
C. Bolling et al., "The Brazilian Sugar Industry: Recent Developments", Sugar and Sweetener Situation & Outlook/SSS-232/Sep. 2001, pp. 14-18, Economic Research Service/USDA.

* cited by examiner

*Primary Examiner* — Frantzy Poinvil
(74) *Attorney, Agent, or Firm* — Schiff Hardin LLP

(57) ABSTRACT

A process for optimizing a portfolio of products produced from a crop includes the use of an objective function to determine optimized quantities of the products in the portfolio. The objective function, for example, includes quantity terms for the products. The objective function may also include additional terms such as an energy term and/or a storage term. The energy term, for example, relates to an amount of energy required to produce the products. The storage term, for example, relates to the cost of storing products. The crop, for example, may be sugarcane, and the products, for example, may be sugar, molasses, bagasse, biofuel, electricity, and/or carbon credits.

32 Claims, 4 Drawing Sheets

COMPUTER EVALUATION OF CROP RELATED INDUSTRIES

RELATED APPLICATIONS

This application discloses subject matter similar to that disclosed in U.S. patent application Ser. No. 11/445,053 filed on May 31, 2006, U.S. patent application Ser. No. 11/872,826 filed on Oct. 16, 2007, and U.S. patent application Ser. No. 11/872,999 filed on Oct. 16, 2007.

TECHNICAL FIELD

The technical field of this disclosure relates, inter alia, to the evaluation of the trade offs relating to certain crop industries such as the sugar industry.

BACKGROUND

Many crop industries such as the sugar industry are becoming highly competitive due to globalization of competition. Cost effectiveness of a crop industry such as the sugar industry, for example, can be enhanced by optimally utilizing resources in the production of sugar products and by-products in different proportions in response to economic dynamics in the marketplace.

Traditionally, a crop industry such as the sugar industry has focused on the main crop product such as sugar. In the past, this strategy was justified as the other by-products (bio-fuels such as ethanol, butanol, bio-diesel or green-diesel, energy in form of electricity, bagasse, and molasses) were of secondary importance economically. In today's global economy, however, the price of the main crop product such as sugar fluctuates significantly as it is governed by global supply and demand. Also, because of the desire to decrease dependency on fossil fuels and because of an increased concern about global warming, the focus on and incentives for the production of bio-fuels have increased. The volatile prices of crude oil and electric power result in commensurate volatility in the price of bio-fuels. In addition, electric power generation using renewable sources (such as bagasse) fetches carbon credit revenues. For the sake of simplicity, the sugar industry will be considered as an example case of a crop industry.

The sugar industry has traditionally produced sugar from sugarcane juice. However, during the production of sugar, other major by-products such as molasses (the residual mass at the end of the crystallization stage) and bagasse (the fibrous residual after extraction of juices from sugarcane) are also produced. As indicated above, these by-products have traditionally been of less economical importance than sugar because of their low prices and demand.

Some sugar mills have converted molasses into bio-fuels by a fermentation process, and have converted bagasse into electricity using a co-generation method. However, because of low return on investment, the further conversion of by-products such as molasses and bagasse into sellable products like bio-fuels and electricity was not lucrative as many nations were mainly using crude oil (obtained by either domestic production or import) for their energy needs.

In today's global economy, where crude oil prices are threatening to become unaffordable, many countries are putting their efforts into developing energy self reliance as a part of their energy security strategies. Moreover, because of increased concern about global warming and stricter emission norms, both developed and developing countries are moving toward the adoption of environmentally friendly fuels. Hence, there is an increased demand for bio-fuels (fuel produced biologically) and green energy. Due to these changed circumstances, bio-fuel production and electricity generation offer additional sources of income to the sugar industry.

Sugar mills in today's changing world now have multiple economic routes for their resources. These mills can either divert the primary and/or secondary juice(s) to bio-fuel manufacturing by fermentation or they can use either or both juices for sugar production. Molasses can be either sold as animal feed and fertilizer or fermented to produce bio-fuels. Even bagasse can be burnt to produce electricity or sold as a raw material for the paper industry or fermented to produce bio-fuels. It should be noted that production of electricity is also possible from the spent wash generated during fermentation to produce bio-fuels such as ethanol. Moreover, the electricity generated using bagasse and spent wash is considered as green energy and earns carbon credits on excess energy (the energy above the internal needs of the sugar mill).

All of these economic alternatives require different time scales and processing costs and energies. In addition, government policies and regulations potentially affect the production levels of each of these end products.

Therefore, an agile decision support framework is needed. This framework should guide a crop industry such as the sugar industry to properly (i) evaluate these trade-offs under various what-if scenarios, and (ii) make optimal decisions related to the key intermediate resources, products, and by-products. Such a decision support system would help a crop industry such as a sugar mill to consistently drive its operations toward the optimization of profits and/or products and/or costs.

BRIEF DESCRIPTION OF THE DRAWINGS

Features, aspects, and advantages of the present invention will become better understood when the following detailed description is read with reference to the accompanying drawings in which.

DETAILED DESCRIPTION

Figure 4:
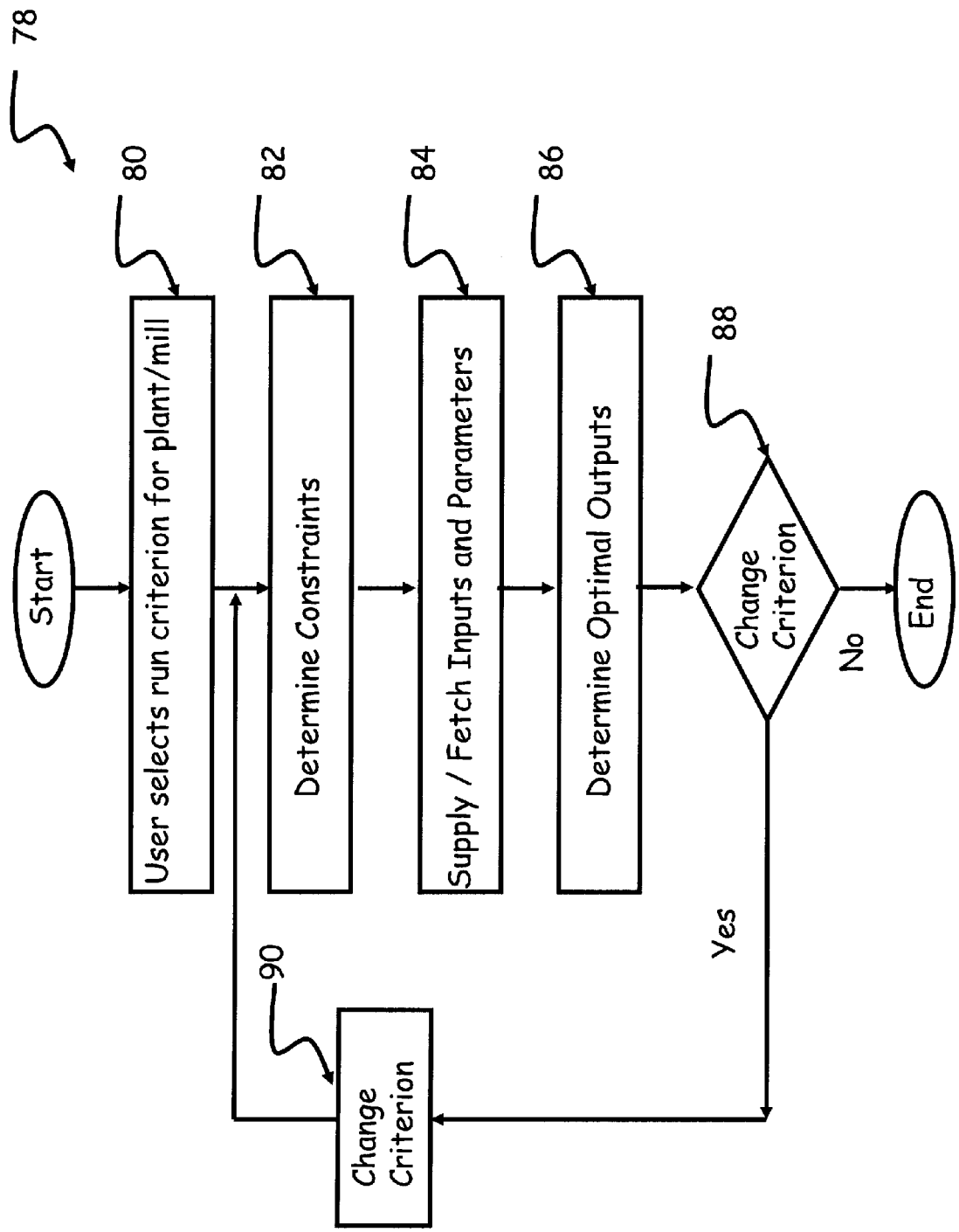

An agile decision support system can help a crop industry to drive the industry in the most profitable manner. The decision support system described herein formulates and solves an optimization problem for a given what-if scenario. FIG. 4 illustrates steps involved in a decision support system 78. As shown in FIG. 4, at 80 in the decision support system 78, a user has the choice of selecting the best run criterion/criteria of the plant or mill. Thus, only the terms corresponding to the user selected criterion/criteria will be executed to provide the optimal solution. At 82, the decision support system 78 identifies the constraints, such as those described below, that influence the criterion/criteria selected at 80.

At 84, the decision support system 78 fetches and/or the user provides input data and parameters, such as those described below, related to the criterion/criteria selected at 80 and the constraints identified at 82.

At 86, the decision support system 78 determines the optimal outputs with respect to the criterion/criteria selected at

80. At 86, the decisions support system 78 can use so much of the objective function (47) as is pertinent to the selected constraints as well as to the input data and selected parameters. If the user changes the criterion/criteria as determined at 88, the new criterion/criteria are selected by the user at 90, and program flow returns to 82 to re-run the decision support program 78.

Accordingly, the user is assisted in simulating different what-if scenarios. The application of the decision support system 78 has been explained with reference sugar industry for the profit maximization scenario. In general, however, the decision support system 78 can be used to simulate any other what-if scenario in other crop industries such as where one of the product is bio-fuel and/or energy.

Sugar Industry Related Parameters

Sugarcane is the main raw material for a sugar mill. A typical sugar mill buys sugarcane from various farmers under contract with the sugar mill. Each sugar mill knows the planting date and variety of each crop of each different farmer. Accordingly, the sugar mill generates a harvest schedule for the entire harvest year. This harvest schedule though is revised over time. However, the quantity of sugarcane coming into the sugar mill on any given day is always between the maximum and minimum crushing capacity of the sugar mill.

The quality (generally represented by Pol in Cane or Recovery) of the sugarcane coming to the sugar mill on any given day is also known from the harvest schedule. Therefore, for technical simplicity, the amount of sugarcane harvested ($QC_d^h$) on any given day d is equal to the amount of sugarcane crushed ($QC_d^c$) on any given day d during the entire harvest season. After the sugarcane is crushed, the quantity of primary juice $QPJ_d^p$ obtained on day d and the quantity of secondary juice $QSJ_d^p$ obtained on day d are given by following equations:

$$QPJ_d^p = (PJC_d)(QC_d^c) \forall d \quad (1)$$

$$QPJ_d^p = (SJC_d)(QC_d^c) \forall d \quad (2)$$

where $PJC_d$ and $SJC_d$ are the respective yields of the primary and secondary juices per ton of sugarcane crushed.

Sugarcane is generally crushed in two stages. The juice produced from the first stage is called primary juice, and the juice produced from the second stage is called secondary juice. Primary juice is more concentrated than secondary juice.

Though these yields depend on the quality of the cane crushed, the nominal values are, for example, thirty-seven tons of primary juice and sixty-five tons of secondary juice per 100 tons of cane crushed. Either these nominal fixed values for all harvest days or empirical relationships may be used to calculate the values for $PJC_d$ and $SJC_d$ for each given day, taking into consideration the quality of cane harvested on the given day. The empirical relationships are generally devised using domain knowledge, industry practice, and/or research findings, and are known to those skilled in the art. The sugar concentration $CPJ_d$ in the primary juice for day d and the sugar concentration $CSJ_d$ in the secondary juice for day d may be calculated using following set of equations:

$$CPJ_d = \frac{(POC_d)(PJSF_d)}{PJC_d} \forall d \quad (3)$$

$$CSJ_d = \frac{(POC_d)(SJSF_d)}{SJC_d} \forall d \quad (4)$$

where $POC_d$ is the quality Pol in the sugarcane on day d as predicted by the harvest schedule, $PJSF_d$ is the fraction of the total sugar that is extracted from the sugarcane on day d for primary juice, and $SJSF_d$ is the fraction of the total sugar that is extracted from the sugarcane on day d for secondary juice. The fractions $PJSF_d$ and $SJSF_d$ also depend on the quality of the sugarcane, and can be derived using domain knowledge, industry practice, and/or research findings. The nominal values for $PJSF_d$ and $SJSF_d$, for example, are in the ranges 0.7-0.8 and 0.3-0.2, respectively. The empirical relationships for these fractions are known to those skilled in the art.

Similarly, the quantity of bagasse produced on day d is known a priori taking into consideration the quantity and quality of sugarcane crushed on that day. Therefore, the quantity of produced bagasse is given by the following equation:

$$QB_d^p = (BC_d)(QC_d^c) \forall d \quad (5)$$

where $BC_d$ represents the yield of bagasse per ton of sugarcane. The nominal value for $BC_d$ is, for example, 0.25 T. However, this value for $BC_d$ depends on the quality of the sugarcane, and can be up to 0.4 T. The actual value for $BC_d$ on day d can be calculated using the empirical relationship known to those skilled in art.

Sugar Industry Related Constraints

The sugar that is produced on day d depends on the split between primary and secondary juices that are used for sugar production. The fractions of the primary and secondary juices used for sugar production may be designated as $fpj_d$ and $fsj_d$, respectively. Hence, the quantity $qs_d^p$ of sugar produced on day d is given by the following equation:

$$qs_d^p = (CPJ_d)(QPJ_d^p)(PJE_d)(fpj_d) + (CSJ_d)(QSJ_d^p)(SJE_d)(fsj_d) \forall d \quad (6)$$

($\forall d$=for all d), where $PJE_d$ and $SJE_d$ are the mill efficiencies related to the conversion of the primary and secondary juices to sugar, respectively. Sugar is the main product from the sugar mill and is sold on the open market. However, the quantity of sugar to market $qs_d^m$ on day d cannot be more than the current stock of sugar. Hence, the following constraint applies:

$$qs_d^m \leq OPS + \sum_{d'=1}^{d} qs_{d'}^p - \sum_{d'=1}^{d-1} qs_{d'}^m \forall d \quad (7)$$

where OPS represents the mill's opening stock of sugar at the start of the harvest season. The opening stock of sugar at the start of harvest season is the sugar that the sugar mill has on hand at the beginning of the harvest season.

The index d' as used herein is an index notation for day count. If there is need to use more than one index notation for day count in same equation, then one of the index notations is designated with the prime.

Similarly on day d, the stock of sugar at the sugar mill should not be more than the capacity $STCS_d$ of the sugar mill for storing sugar on day d. This constraint is given by the following equation:

$$OPS + \sum_{d'=1}^{d} qs_{d'}^{p} - \sum_{d'=1}^{d} qs_{d'}^{m} \leq STCS_d \; \forall \; d \quad (8)$$

It should be understood that producing sugar from primary juice is more economical compared to producing sugar from secondary juice. Hence, bio-fuels are produced from primary juice only after the entire supply of secondary juice is diverted for fermentation. Though primary and/or secondary juices can be used for the production of different bio-fuels such as ethanol, butanol, bio/green diesel, for discussion below will consider ethanol production as an example case. However, it is very straight forward for those skilled in the art to extend the stated formulation for any combination of bio-fuels.

The binary variable $bpj_d$ may be used to indicate whether primary juice is to be used for ethanol production or not. Hence, if $bpj_d=1$, then primary juice is diverted to ethanol production, and if $bpj_d=0$, then primary juice is not diverted to ethanol production according to the following constraints:

$$fsj_d \geq (1-bpj_d) \forall d \quad (9)$$

$$fpj_d \geq (1-bpj_d) \forall d \quad (10)$$

It is assumed that the sugar mill has sufficient capacity to process entirely the primary and secondary juices. In other words, an $fsj_d=1$ and $fpj_d=1$ condition is allowed in the formulation without capacity constraints. However, when this assumption is not the case, then corresponding capacity constraints easily can be added.

Molasses Related Constraints

There are three types of molasses, namely A, B, and C molasses, that are produced during sugar production. The quantity $qam_d^p$ of type A molasses that is produced on day d, the quantity $qbm_d^p$ of type B molasses that is produced on day d, and the quantity $qcm_d^p$ of type C molasses that is produced on day d depend on what fractions of the primary and secondary juices are used for sugar production. These quantities are given by the following equations:

$$qam_d^p = (AMPJ_d)(QPJ_d^p)(fpj_d) + (AMSJ_d)(QSJ_d^p)(fsj_d) \; \forall d \quad (11)$$

$$qbm_d^p = (BMPJ_d)(QPJ_d^p)(fpj_d) + (BMSJ_d)(QSJ_d^p)(fsj_d) \; \forall d \quad (12)$$

$$qcm_d^p = (CMPJ_d)(QPJ_d^p)(fpj_d) + (CMSJ_d)(QSJ_d^p)(fsj_d) \; \forall d \quad (13)$$

where $AMPJ_d$ is the yield of type A molasses per ton of primary juice on day d, $BMPJ_d$ is the yield of type B molasses per ton of primary juice on day d, $CMPJ_d$ is the yield of type C molasses per ton of primary juice on day d, $AMSJ_d$ is the yield of type A molasses per ton of secondary juice on day d, $BMSJ_d$ is the yield of type B molasses per ton of secondary juice on day d, and $CMSJ_d$ is the yield of type C molasses per ton of secondary juice on day d. These yields depend on the quality of the primary and secondary juices. The empirical relationship to calculate the values of these yields are known to those skilled in the art.

As discussed earlier, each type of molasses can be either sold to market or used for the production of bio-fuels. Though it is very much possible to produce different bio-fuels from molasses, for simplicity the discussion herein considers ethanol production as an example case. Modification of the formulation to consider any combination of bio-fuels is easy for those skilled in the art.

The total quantity allocated to market and used for ethanol manufacturing on day d should be less than the current storage as given by the following constraints:

$$qam_d^e + qam_d^m \leq OPAM + \sum_{d'=1}^{d} qam_{d'}^p - \sum_{d'=1}^{d-1} qam_{d'}^e - \sum_{d'=1}^{d-1} qam_{d'}^m \; \forall \; d \quad (14)$$

$$qbm_d^e + qbm_d^m \leq OPBM + \sum_{d'=1}^{d} qbm_{d'}^p - \sum_{d'=1}^{d-1} qbm_{d'}^e - \sum_{d'=1}^{d-1} qbm_{d'}^m \; \forall \; d \quad (15)$$

$$qcm_d^e + qcm_d^m \leq OPCM + \sum_{d'=1}^{d} qcm_{d'}^p - \sum_{d'=1}^{d-1} qcm_{d'}^e - \sum_{d'=1}^{d-1} qcm_{d'}^m \; \forall \; d \quad (16)$$

where OPAM represents the opening stock for type A molasses on day d, OPBM represents the opening stock for type B molasses on day d, OPCM represents the opening stock for type C molasses on day d, $qam_d^e$ is the quantity of type A molasses that is used for ethanol production on day d, $qbm_d^e$ is the quantity of type B molasses that is used for ethanol production on day d, $qcm_d^e$ is the quantity of type C molasses that is used for ethanol production on day d, $qam_d^m$ is the quantity of type A molasses that is sold to market on day d, $qbm_d^m$ is the quantity of type B molasses that is sold to market on day d, and $qcm_d^m$ is the quantity of type C molasses that is sold to market on day d.

In addition, the quantity of each type of molasses available on day d within the sugar mill should be less than the storage capacity for each type as given by the following constraints:

$$OPAM + \sum_{d'=1}^{d} qam_{d'}^p - \sum_{d'=1}^{d} qam_{d'}^e - \sum_{d'=1}^{d} qam_{d'}^m \leq STCAM_d \; \forall \; d \quad (17)$$

$$OPBM + \sum_{d'=1}^{d} qbm_{d'}^p - \sum_{d'=1}^{d} qbm_{d'}^e - \sum_{d'=1}^{d} qbm_{d'}^m \leq STCBM_d \; \forall \; d \quad (18)$$

$$OPCM + \sum_{d'=1}^{d} qcm_{d'}^p - \sum_{d'=1}^{d} qcm_{d'}^e - \sum_{d'=1}^{d} qcm_{d'}^m \leq STCCM_d \; \forall \; d \quad (19)$$

where $STCAM_d$ is the mill's storage capacity for molasses A on day d, $STCBM_d$ is the mill's storage capacity for molasses B on day d, and $STCCM_d$ is the mill's storage capacity for molasses C on day d.

Bagasse Related Constraints

The other by-product of sugar industry is bagasse which can also be sold to market or used for the production of bio-fuels. Though it is very much possible to produce different bio-fuels from bagasse, for simplicity the discussion herein considers ethanol production as an example case. Modification of the formulation to consider any combination of bio-fuels is easy for those skilled in the art. Additionally, bagasse can be burnt in co-generation facilities to produce electricity. However, its use and storage on day d is restricted by the available stock and storage capacity as given by the following constraints:

$$qb_d^e + qb_d^m + qb_d^{el} \leq OPB + \sum_{d'=1}^{d} QB_{d'}^p - \sum_{d'=1}^{d-1} (qb_{d'}^e + qb_{d'}^m + qb_{d'}^{el}) \; \forall \; d \quad (20)$$

-continued $$OPB + \sum_{d'=1}^{d} QB_{d'}^{p} - \sum_{d'=1}^{d} (qb_{d'}^{e} + qb_{d'}^{m} + qb_{d'}^{el}) \leq STCB_d \; \forall \; d \quad (21)$$

where $qb_d^e$ is the quantity of bagasse that is used for ethanol production on day d, $qb_d^m$ is the quantity of bagasse that is sold to market on day d, $qb_d^{el}$ is the quantity of bagasse that is burned for electricity on day d, OPB is the mill's opening stock of bagasse at the start of the harvest season, and $STCB_d$ is the mill's storage capacity for bagasse on day d.

The quantity of bagasse allocated for burning in a co-generation facility should be less than the capacity of the co-generation facility as given by the following constraint:

$$qb_d^{el} \leq PCCP \quad (22)$$

where PCCP is the processing capacity of a co-generation facility. Some co-generation plants need certain minimum quantities of bagasse to be burnt everyday to keep them operational without additional cost. The constraint related to this minimum quantity can be easily added into the formulation by those skilled in the art.

Bio-fuel Related Constraints

Bio-fuels are produced from primary juice, secondary juice, all types of molasses, and bagasse. However, for simplicity, this discussion consider ethanol production as an example case. Modification of the formulation described herein to consider any combination of bio-fuels is easy for those skilled in the art.

The yield of ethanol per ton from each of these above mentioned sources varies. Also, the time required to produce ethanol from these different sources is different. Thus, the quantity of ethanol that is produced is given by the following equation:

$$qe_d^p = (EAM)(qam_d^e) + (EBM)(qbm_d^e) + (ECM)(qcm_d^e) + (EB)(qb_d^e) + \quad (23)$$
$$(EPJ)(QPJ_d^p)(1 - fpj_d) + (ESJ)(QSJ_d^p)(1 - fsj_d) \; \forall \; d$$

where $qe_d^p$ is the quantity of ethanol produced on day d, EAM is yield of ethanol per ton of type A molasses, EBM is yield of ethanol per ton of type B molasses, ECM is yield of ethanol per ton of type C molasses, EB is yield of ethanol per ton of bagasse, EPJ is yield of ethanol per ton of primary juice, and ESJ is yield of ethanol per ton of secondary juice, The nominal values for ethanol yield from the different sources are known to those skilled in the art. For example, from one ton of type B molasses, 348 liters of ethanol is produced while the yield of ethanol per ton of type C molasses is around 250 liters. From one ton of raw secondary juice, approximately 48 liters of ethanol is produced. However, from one ton of heated secondary juice, the yield of ethanol is approximately 58 liters. In addition, the values of yield can depend on the quality of the source used. Hence, these ethanol yield values are dependent on the design of the ethanol plant and the quality of the source. Either the nominal value or the day dependent value, which can be obtained using the empirical relationships known to those skilled in the art, can be used.

The ethanol fermentation process can be either continuous or batch. The fermentation batch size and time in the case of batch operation or the source input rate to fermenter in the case of continuous operation depends on the type of source used. For example, the nominal values for time in the batch process, when secondary juice and types B and C molasses are used as the sources, are 15, 21 and 18 hours, respectively. In the continuous process, the total time required for all sources to feed to the ethanol fermenter(s) should be less than 1 day. Hence, the following constraint applies:

$$\frac{qam_d^e}{FRAM} + \frac{qbm_d^e}{FRBM} + \frac{qcm_d^e}{FRCM} + \frac{qb_d^e}{FRB} + \quad (24)$$
$$\frac{(QPJ_d^p)(1 - fpj_d)}{FRPJ} + \frac{(QSJ_d^p)(1 - fsj_d)}{FRSJ} \leq 24 \; \forall \; d$$

where FRAM is the feed rate of type A molasses to an ethanol fermenter in a continuous process, FRBM is the feed rate of type B molasses to an ethanol fermenter in a continuous process, FRCM is the feed rate of type C molasses to an ethanol fermenter in a continuous process, FRB is the feed rate of bagasse to an ethanol fermenter in a continuous process, FRPJ is the feed rate of primary juice to an ethanol fermenter in a continuous process, and FRSJ is the feed rate of secondary juice to an ethanol fermenter in a continuous process.

In a batch operation, the quantities of the different sources allocated for ethanol production on day d can take more than one day time depending on the batch times. Hence, the following constraint applies:

$$\sum_{d'=d}^{HD} \left( \frac{(qam_{d'}^e)(BTAM)}{BSAM} + \frac{(qbm_{d'}^e)(BTBM)}{BSBM} + \right. \quad (25)$$
$$\left. \frac{(qcm_{d'}^e)(BTCM)}{BSCM} + \frac{(qb_{d'}^e)(BTB)}{BSB} + \right)$$
$$\sum_{d'=d}^{HD} \left( \frac{(QPJ_{d'}^p)(BTPJ)(1 - fpj_{d'})}{BSPJ} + \frac{(QSJ_{d'}^p)(BTSJ)(1 - fsj_{d'})}{BSSJ} \right) \leq$$
$$24(HD - d) \; \forall \; d$$

where HD is the total number of harvest days, BETAM is the batch time for the ethanol fermentation of type A molasses, BTBM is the batch time for the ethanol fermentation of type B molasses, BTCM is the batch time for the ethanol fermentation of type C molasses, BTB is the batch time for the ethanol fermentation of bagasse, BTPJ is the batch time for the ethanol fermentation of primary juice, BTSJ is the batch time for the ethanol fermentation of secondary juice, BSPJ is the batch size of the primary juice used in ethanol fermentation, BSSJ is the batch size of the secondary juice used in ethanol fermentation, BSAM is the batch size of type A molasses used in ethanol fermentation, BSBM is the batch size of type B molasses used in ethanol fermentation, BSCM is the batch size of type C molasses used in ethanol fermentation, and BSB is the batch size of bagasse used in ethanol fermentation.

Ethanol has two grades, industry grade and fuel grade. The constraint given by equations (24) and (25) are for industry grade ethanol. Fuel grade ethanol is obtained from industry grade ethanol by a dehydration process. The processing capacity of the dehydration process may be designated as PCDP, and the quantity of industry grade ethanol sent to the dehydration process on day d to produce fuel grade ethanol may be designated as $qe_d^{fg}$. The following constraint then applies:

$$qe_d^{fg} \leq PCDP \forall d \quad (26)$$

The quantity $qfge_d^p$ of fuel grade ethanol that is produced on day d per liter of industry grade ethanol is approximately 0.96-0.97 liter and is given by the following equation:

$$qfge_d^p = (FGEIGE)(qe_d^{fg}) \forall d \qquad (27)$$

where FGEIGE is the yield of fuel grade ethanol per ton of industry grade ethanol.

Both industry and fuel ethanol grades have market value. However, the quantity $qe_d^m$ of industry grade ethanol sold to the market on day d plus the quantity $qe_d^{fg}$ of industry grade ethanol that is used to produce fuel grade ethanol on day d should not be more than current available stock, as given by the following constraint:

$$qe_d^m + qe_d^{fg} \leq OPIGE + \sum_{d'=1}^{d} qe_{d'}^p - \sum_{d'=1}^{d-1}(qe_{d'}^m + qe_{d'}^{fg}) \forall d \qquad (28)$$

where OPIGE is the opening stock of industry grade ethanol at the start of the harvest season.

Similarly, the quantity $qfge_d^m$ of fuel grade ethanol sold to the market on day d should not be more than current available stock, as given by the following constraint:

$$qfge_d^m \leq OPFGE + \sum_{d'=1}^{d} qfge_{d'}^p - \sum_{d'=1}^{d-1} qfge_{d'}^m \forall d \qquad (29)$$

where OPFGE is the opening stock of fuel grade ethanol at the start of the harvest season.

The quantity of industry grade ethanol available in the sugar mill on any given day d should not be more than the storage capacity $STCIGE_d$ for industry grade ethanol on day d as given by the following constraint:

$$OPIGE + \sum_{d'=1}^{d} qe_{d'}^p - \sum_{d'=1}^{d}(qe_{d'}^m + qe_{d'}^{fg}) \leq STCIGE_d \forall d \qquad (30)$$

Similarly, the quantity of fuel grade ethanol available in the sugar mill on any given day d should not be more than the storage capacity $STCFGE_d$ for fuel grade ethanol on day d as given by the following constraint:

$$OPFGE + \sum_{d'=1}^{d} qfge_{d'}^p - \sum_{d'=1}^{d} qfge_{d'}^m \leq STCFGE_d \forall d \qquad (31)$$

During ethanol production, the sugar mill also produces spent wash as a byproduct. Approximately fourteen liters of spent wash is produced per liter of ethanol. However, this figure again depends on the type of source used and its quality. The total spent wash $qsw_d^p$ produced on any given day d is given by the following equation:

$$qsw_d^p = (SWAM)(qam_d^e) + \qquad (32)$$
$$(SWBM)(qbm_d^e) + (SWCM)(qcm_d^e) + (SWB)(qb_d^e) +$$
$$(SWPJ)(QPJ_d^p)(1-fpj_d) + (SWSJ)(QSJ_d^p)(1-fsj_d) \forall d$$

where SWAM is the spent wash yield per ton of type A molasses, SWBM is the spent wash yield per ton of type B molasses, SWCM is the spent wash yield per ton of type C molasses, SWB is the spent wash yield per ton of bagasse, SWPJ is the spent wash yield per ton of primary juice, and SWSJ is the spent wash yield per ton of secondary juice.

The spent wash so generated is then converted into biogas and finally into electricity depending on the capacity availability.

Energy Related Constraints

All of the process operations such as juice evaporation, crystallization, ethanol fermentation and dehydration, etc. need the input of thermal, mechanical, and electrical energy. However, it is always possible for those skilled in the art to calculate the steam equivalent of the total energy requirement for all of these process operations. The total steam requirement $sr_d$ for day d is given by the following equation:

$$sr_d = (SRCC)(QC_d^c) + (SRPJS_d)(QPJ_d^p)(fpj_d) + \qquad (33)$$
$$(SRSJS_d)(QSJ_d^p)(fsj_d) + (SRPJE_d)(QPJ_d^p)(1-fpj_d) +$$
$$(SRSJE_d)(QSJ_d^p)(1-fsj_d) + (SRAME)(qam_d^e) + (SRBME)(qbm_d^e) +$$
$$(SRCME)(qcm_d^e) + (SRBE)(qb_d^e) + (SRIGFGE)(qe_d^{fg}) \forall d$$

where SRCC is the steam requirement for crushing a ton of sugarcane, $SRPJS_d$ is the steam requirement on day d to convert primary juice to sugar per ton of primary juice, $SRSJS_d$ is the steam requirement on day d to convert secondary juice to sugar per ton of secondary juice, $SRPJE_d$ is the steam requirement on day d to convert primary juice to ethanol per ton of primary juice, $SRSJE_d$ is the steam requirement on day d to convert secondary juice to ethanol per ton of secondary juice, $SRAME_d$ is the steam requirement on day d to convert type A molasses to ethanol per ton of type A molasses, $SRBME_d$ is the steam requirement on day d to convert type B molasses to ethanol per ton of type B molasses, $SRCME_d$ is the steam requirement on day d to convert type C molasses to ethanol per ton of type C molasses, $SRBE_d$ is the steam requirement on day d to convert bagasse to ethanol per ton of bagasse, and $SRIGFGE_d$ is the steam requirement on day d to convert industry grade ethanol to fuel grade ethanol per ton of industry grade ethanol.

In sugar mills, steam is generated using bagasse and/or fossil fuels according to the following equation:

$$sp_d = (SGB)(qb_d^{el}) + (SGF)(qf\!f_d^{el}) \forall d \qquad (34)$$

where $sp_d$ is the steam produced on day d, SGB is the steam economy from Bagasse, SGF is the steam economy from fossil fuel, and $aff_d^{el}$ is the quantity of fossil fuel to produce electricity on day d.

The total steam produced on any day d should be more than the requirement for steam on that given day. This constraint is important on days when sugarcane is not being crushed but ethanol fermentation and dehydration are running and is given by the following:

$$sr_d \leq sp_d \qquad (35)$$

Sugar mills can produce on day d more energy than they use and hence can send the surplus electricity to the power grid. This surplus of energy $qel_d^p$ is given by the following equation:

$$qel_d^p = (ELS)(sp_d - sr_d) + (ELSW)(qsw_d^p) \forall d \qquad (36)$$

where ELS is the electricity generated per ton of steam, and ELSW is the electricity generated per ton of spent wash.

It is assumed that the capacity to convert spent wash into electricity is sufficient. In addition, the steam generated can have a different pressure and temperature depending on the design of boiler used in the co-generation unit.

Demand Constraints

The correct way to obtain the optimal levels of various value added products is without any constraints on product quantities. However, sugar mills might have agreements with market players of value added products about the supplied quantities. The quantities subject to such agreements become demand constraints. It is safe to assume that these demand quantities are obtained taking into consideration processing capacity and supply agreements. Hence, the following set of constraints should be added to the decision support system formulation:

$$\sum_{d'=1}^{d} qs_{d'}^{m} \geq \sum_{d'=1}^{d} DES_{d'} \quad \forall d \quad (37)$$

$$\sum_{d'=1}^{d} qam_{d'}^{m} \geq \sum_{d'=1}^{d} DEAM_{d'} \quad \forall d \quad (38)$$

$$\sum_{d'=1}^{d} qbm_{d'}^{m} \geq \sum_{d'=1}^{d} DEBM_{d'} \quad \forall d \quad (39)$$

$$\sum_{d'=1}^{d} qcm_{d'}^{m} \geq \sum_{d'=1}^{d} DECM_{d'} \quad \forall d \quad (40)$$

$$\sum_{d'=1}^{d} qb_{d'}^{m} \geq \sum_{d'=1}^{d} DEB_{d'} \quad \forall d \quad (41)$$

$$\sum_{d'=1}^{d} qe_{d'}^{m} \geq \sum_{d'=1}^{d} DEIGE_{d'} \quad \forall d \quad (42)$$

$$\sum_{d'=1}^{d} qfge_{d'}^{m} \geq \sum_{d'=1}^{d} DEFGE_{d'} \quad \forall d \quad (43)$$

$$qel_{d}^{p} \geq DEEL_{d} \quad \forall d \quad (44)$$

where $DES_d$ is the demand for sugar on day d, $DEAM_d$ is the demand for type A molasses on day d, $DEBM_d$ is the demand for type B molasses on day d, $DECM_d$ is the demand for type C molasses on day d, $DEB_d$ is the demand for bagasse on day d, $DEIGE_d$ is the demand for industry grade ethanol on day d, $DEFGE_d$ is the demand for fuel grade ethanol on day d, and $DEEL_d$ is the demand for electricity on day d.

The production of any value added product till day d can be more than the given demand on any given day d.

Carbon Credits Related Constraints

The electricity generated using bagasse is considered green energy and earns carbon credits on the excess (surplus) energy that is generated as indicated by the following equation:

$$ccbel_d = (ELS)\left(1 + \frac{TL}{100}\right)(NCECR - NCEBR)(sp_d - sr_d) \quad \forall d \quad (45)$$

where $ccbel_d$ is the carbon credits that are earned on day d from electricity that is generated using bagasse, TL is the electricity transmission loss, NCECR is the net carbon emission for electricity generated using coal, and NCEBR is the net carbon emission for electricity generated using bagasse.

The electricity generated using spent wash is also considered green energy and earns carbon credits on the excess (surplus) energy that is generated as indicated by the following equation:

$$ccswel_d = (ELSW)\left(1 + \frac{TL}{100}\right)(NCECR - NCESWR)(qsw_d^p) \quad \forall d \quad (46)$$

where $ccswel_d$ is the carbon credits that are earned on day d from electricity that is generated using spent wash, and NCESWR is the net carbon emission for electricity generated using spent wash.

The transmission losses given by TL vary from country to country and vicinity of the area using the electricity generated. These transmission losses generally vary in the range of 20-40%. Nominal values for the net carbon emission using coal is, for example, 950 g/KWH, and using bagasse is, for example, 120 g/KWH (bagasse route). The nominal value for the net carbon emission using spent wash is generally less than that using bagasse. The values of NCEBR and NCESWR depend on farming practices and use of locomotives, tractors, etc. during farming and can change from location to location. The bio-fuels generated using sugar industry by-products is also a form of green energy. In today's carbon credit system, bio-fuels do not earn any credit. However, if bio-fuels earn credit in the future, constraints to calculate the carbon credit from bio-fuels can be easily added.

Objective Function

One objective herein is to determine the optimal production levels for value added products taking into consideration the various economical trade-offs. The objective function is then used to maximize profit over the entire harvest season.

An example of an objective function to determine these optimum production levels is given by the following equation:

$$\max OBJ = \quad (47)$$

$$\sum_{d} ((PS_d)(qs_d^m) + (PIGE_d)(qe_d^m) + (PFGE_d)(qfge_d^m) + (PB_d)(qb_d^m)) +$$

$$\sum_{d} ((PAM_d)(qam_d^m) + (PBM_d)(qbm_d^m) + (PCM_d)(qcm_d^m)) +$$

$$\sum_{d} ((PEU_d)(qel_d^m) + (PCC_d)(ccbel_d - ccswel_d) + (PFF_d)(qff_d^{et})) -$$

$$\sum_{d} \left[ STPSF_d + (STPSV_d)\left(OPS + \sum_{d'=1}^{d} qs_{d'}^p - \sum_{d'=1}^{d} qs_{d'}^m\right) \right] -$$

$$\sum_{d} \left[ STPIGEF_d + \right.$$

-continued $$(STPIGEV_d)\left(OPIGE + \sum_{d'=1}^{d} qe_{d'}^{p} - \sum_{d'=1}^{d}(qe_{d'}^{m} + qe_{d'}^{fg})\right)\right] -$$

$$\sum_{d}\left[STPFGEF_d + (STPFGEV_d)\right.$$

$$\left(OPFGE + \sum_{d'=1}^{d} qfge_{d'}^{p} - \sum_{d'=1}^{d} qfge_{d'}^{m}\right)\right] -$$

$$\sum_{d}\left[STPAMF_d + (STPAMV_d)\right.$$

$$\left(OPAM + \sum_{d'=1}^{d} qam_{d'}^{p} - \sum_{d'=1}^{d} qam_{d'}^{e} - \sum_{d'=1}^{d} qam_{d'}^{m}\right)\right] -$$

$$\sum_{d}\left[STPBMF_d + (STPBMV_d)\right.$$

$$\left(OPBM + \sum_{d'=1}^{d} qbm_{d'}^{p} - \sum_{d'=1}^{d} qbm_{d'}^{e} - \sum_{d'=1}^{d} qbm_{d'}^{m}\right)\right] -$$

$$\sum_{d}\left[STPCMF_d + (STPCMV_d)\left(OPCM + \sum_{d'=1}^{d} qcm_{d'}^{p} - \right.\right.$$

$$\left.\left.\sum_{d'=1}^{d} qcm_{d'}^{e} - \sum_{d'=1}^{d} qcm_{d'}^{m}\right)\right] - \sum_{d}\left[STPBF_d + \right.$$

$$(STPBV_d)\left(OPB + \sum_{d'=1}^{d} QB_{d'}^{p} - \sum_{d'=1}^{d}(qb_{d'}^{m} + qb_{d'}^{el} + qb_{d'}^{e})\right)\right] \forall d$$

where $PS_d$ is the price of sugar on day d, $PIGE_d$ is the price of industry grade ethanol on day d, $PFGE_d$ is the price of fuel grade ethanol on day d, $PB_d$ is the price of bagasse on day d, $PAM_d$ is the price of type A molasses on day d, $PBM_d$ is the price of type B molasses on day d, $PCM_d$ is the price of type C molasses on day d, $PEU_d$ is the price of electricity on day d, $PCC_d$ is the price of carbon credits on day d, $PFF_d$ is the price of fossil fuel on day d, $STPSF_d$ is the fixed price for storage of sugar on day d, $STPSV_d$ is the variable price for storage of sugar on day d, $STPIGEF_d$ is the fixed price for storage of industry grade ethanol on day d, $STPIGEV_d$ is the variable price for storage of industry grade ethanol on day d, $STPFGEF_d$ is the fixed price for storage of fuel grade ethanol on day d, $STPFGEV_d$ is the variable price for storage of fuel grade ethanol on day d, $STPAMF_d$ is the fixed price for storage of type A molasses on day d, $STPAMV_d$ is the variable price for storage of type A molasses on day d, $STPBMF_d$ is the fixed price for storage of type B molasses on day d, $STPBMV_d$ is the variable price for storage of type B molasses on day d, $STPCMF_d$ is the fixed price for storage of type C molasses on day d, $STPCMV_d$ is the variable price for storage of type C molasses on day d, $STPBF_d$ is the fixed price for storage of bagasse on day d, and $STPBV_d$ is the variable price for storage of bagasse on day d.

Quantities represented with lower case letters herein are variables, and quantities represented with upper case lettering herein are parameters. The lower case quantities in equation (47) are the variables of the objective function. The values of these variables that produce a maximum output of equation (47) are to be determined from the objective function. The values of the parameters in equation (47) are inputs or constants.

When the objective function of equation (47) is used to determine the best mix of sugar products and byproducts at a future day d, the parameters in equation (47) will need to be forecasted. Therefore, the accuracy in determining the mix of sugar products and byproducts that produce maximum profits will depend on the accuracy of the forecasts.

The first three lines of equation (47) represent the revenues that can be derived from various sugar products and byproducts. Subtracted from these revenues are the storage costs for these products and byproducts represented by the remaining seven lines of equation (47).

It should be understood that the objective function of equation (47) can be simplified or modified depending upon which value added products are to be produced and which constraints are to be considered.

The formulation given by equation (47) is a mixed integer linear programming formulation. The stated objective addresses the various trade-offs to determine optimal levels of production for different value added sugar related products and byproducts. Also, the formulation can be used to analyze the incremental benefits due to an increase in fermentation, co-generation or storage capacities.

Because the formulation given by equation (47) is a mixed integer linear programming formulation, an iterative mixed integer linear program can be applied to process the objective function. Instead of using iterative mixed integer linear programming, non-iterative mixed integer non-linear programming may be used.

Figure 1:
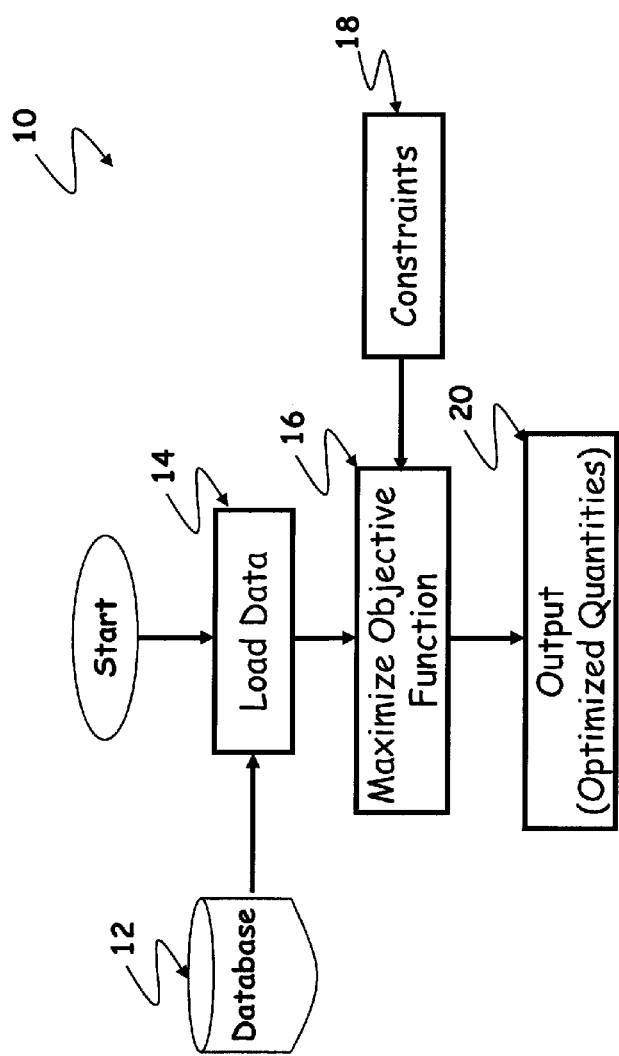
FIG. 1 illustrates a process for optimizing user designed criterion in a crop industry such as a sugar mill.

FIG. 1 is a flow chart of a process 10 for determining optimized quantities for (i) the amount of sugar to be sold to market on day d ($qs_d^m$), (ii) the amount of industry grade ethanol to be sold to market on day d ($qe_d^m$), (iii) the amount of fuel grade ethanol to be sold to market on day d ($qfge_d^m$), (iv) the amount of bagasse to be sold to market on day d ($qb_d^m$), (v) the amount of type A molasses to be sold to market on day d ($qam_d^m$), (vi) the amount of type B molasses to be sold to market on day d ($qbm_d^m$), (vii) the amount of type C molasses to be sold to market on day d ($qcm_d^m$), (viii) the amount of electricity to be produced on day d ($qel_d^p$), (ix) the number of carbon credits to be received from electricity generated on day d by use of bagasse ($ccbel_d$), (x) the number of carbon credits to be received from electricity generated on day d by use of spent wash ($ccswel_d$), and (xi) the amount of fossil fuel used to generate electricity on day d ($aff_d^{el}$).

The process 10 also determines optimized stored quantities for (i) the amount of sugar that is produced but not sold to market $$\left(\sum_{d'=1}^{d} qs_{d'}^{p} - \sum_{d'=1}^{d} qs_{d'}^{m}\right), \quad \text{(ii)}$$

the amount of industry grade ethanol that is produced but not sold to market nor used for the production of fuel grade ethanol $$\left(\sum_{d'=1}^{d} qe_{d'}^{p} - \sum_{d'=1}^{d}(qe_{d'}^{m} + qe_{d'}^{fg})\right), \quad \text{(iii)}$$

the amount of fuel grade ethanol that is produced but not sold to market $$\left(\sum_{d'=1}^{d} qfge_{d'}^{p} - \sum_{d'=1}^{d} qfge_{d'}^{m}\right), \quad \text{(iv)}$$

the amount of type A molasses that is produced but not sold to market nor used in ethanol production $$\left(\sum_{d'=1}^{d} qam_{d'}^{p} - \sum_{d'=1}^{d} qam_{d'}^{e} - \sum_{d'=1}^{d} qam_{d'}^{m}\right), \quad \text{(v)}$$

the amount of type B molasses that is produced but not sold to market nor used in ethanol production $$\left(\sum_{d'=1}^{d} qbm_{d'}^{p} - \sum_{d'=1}^{d} qbm_{d'}^{e} - \sum_{d'=1}^{d} qbm_{d'}^{m}\right), \quad \text{(vi)}$$

the amount of type C molasses that is produced but not sold to market nor used in ethanol production $$\left(\sum_{d'=1}^{d} qcm_{d'}^{p} - \sum_{d'=1}^{d} qcm_{d'}^{e} - \sum_{d'=1}^{d} qcm_{d'}^{m}\right), \text{ and} \quad \text{(vii)}$$

the amount of bagasse that is produced but not sold to market nor used in ethanol production nor used for the generation of electricity $$\left(\sum_{d'=1}^{d} QB_{d'}^{p} - \sum_{d'=1}^{d} (qb_{d'}^{m} + qb_{d'}^{el} + qb_{d'}^{e})\right).$$

Accordingly, as shown in FIG. 1, the relevant input data, which is used in the equations and constraints (1)-(47) and which is maintained in a database 12, is loaded from memory at 14, and the objective function of equation (47) is maximized at 16 using the equations and constraints (1)-(46) as provided at 18.

The optimized quantities that maximize the objective function are provided at 20 as an output of the process 10. This output can be a display, such as on a monitor or in printed form. Alternatively or additionally, this output could be orders and/or contracts to sell and/or to produce the optimized quantities. Other forms of output could also be provided. Thus, the output 20 represents the decisions that can be made as to how the sugar mill can be optimally run.

Figure 2:
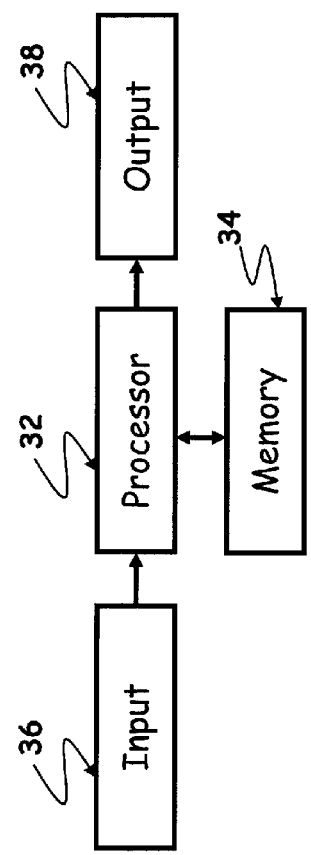
FIG. 2 illustrates a computer that can be used to implement the process of FIG. 1; and, FIGS. 3 and 4 provide additional detail for the process of FIG. 1; and, FIG. 5 provides detailed information related to the application of the decision support system to the sugar industry.

The process corresponding to the flow chart of FIG. 1 can be executed in connection with a computer 30 shown in FIG. 2. The computer 30 includes a processor 32, a memory 34, an input device(s) 36, and an output device(s) 38.

The input device(s) 36 may be a mouse, a keyboard, etc. capable of inputting data to the processor 32. The input device(s) 36 may be used to input the data described above. All of this data may be stored in the memory 34.

The output device(s) 38 may be a monitor, a printer, etc. capable of outputting the quantities discussed above.

The memory 34 stores the input data, the modeling procedure 10 shown in FIG. 2, and/or the outputs provided by the output device(s) 38.

Figure 3:
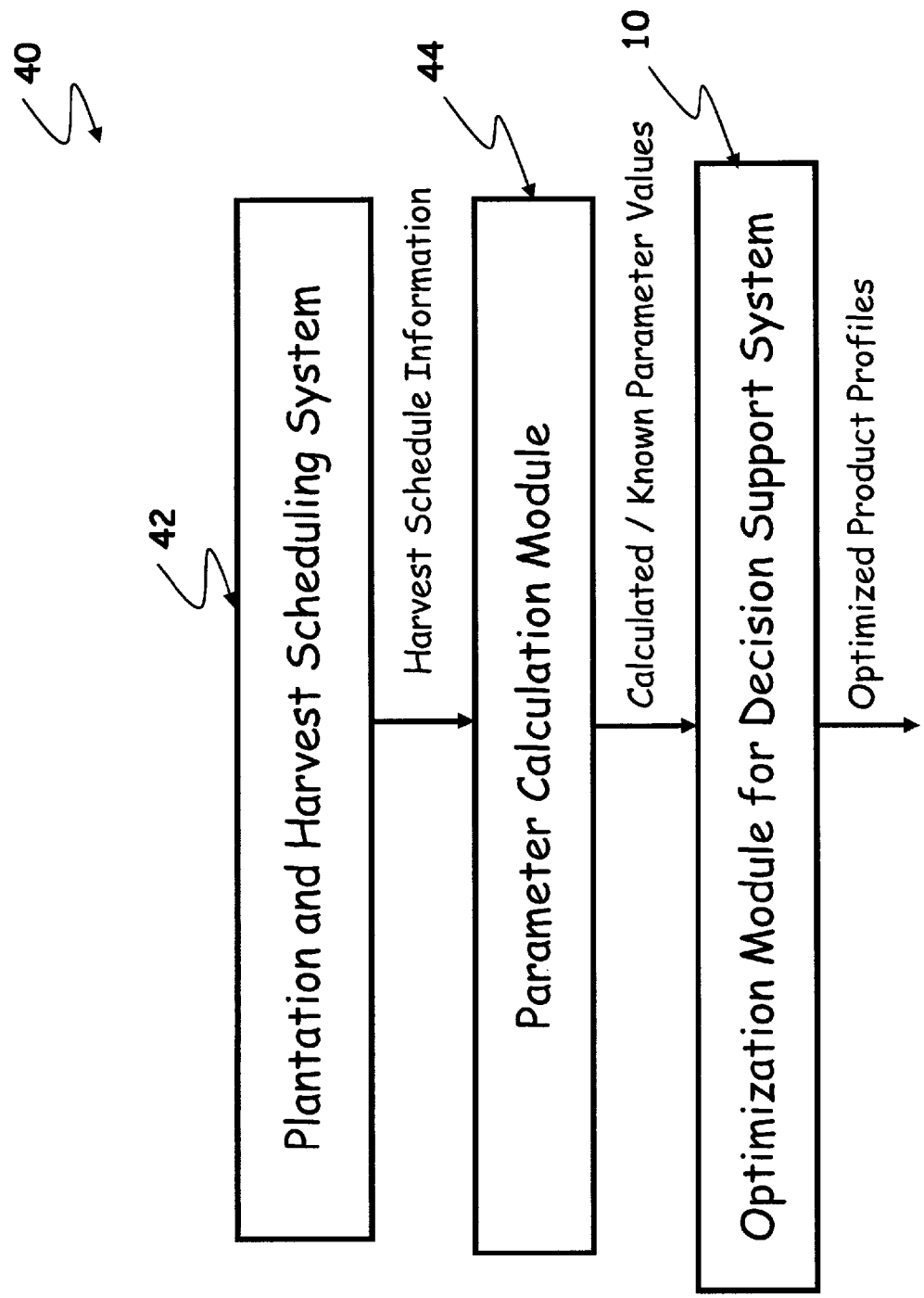

FIG. 3 explains the information flow from a plantation and harvest scheduler 42 to the decision support system 10. The information obtained from the plantation and harvest scheduler 42, includes for example, the amount of sugarcane harvested ($QC_d^h$) on any given day d, the amount of sugarcane crushed ($QC_d^c$) on any given day d during the entire harvest season, the respective yields of primary and secondary juices $PJC_d$ and $SJC_d$, the sugar concentration $CPJ_d$ in the primary juice for day d, the sugar concentration $CSJ_d$ in secondary juice for day d, the quality in the sugarcane on day d as predicted by the harvest schedule ($POC_d$), the fraction of the total sugar that is extracted from the sugarcane on day d for primary juice ($PJSF_d$), and the fraction of the total sugar that is extracted from the sugarcane on day d for secondary juice ($SJSF_d$), and the yield of bagasse per ton of sugarcane ($BC_d$). The parameters discussed herein can be provided by sources other than the plantation and harvest scheduler 42.

The parameters required for decision support system optimization are calculated by a parameter calculation module 44. For example, the parameter calculation module 44 contains the empirical relationships to calculate the values of the different parameters used herein. These empirical relationships are known to those skilled in the art.

FIG. 4 illustrates another version of the program of FIG. 1. This program version is designated 78 in FIG. 4. As shown in FIG. 4, a user has the choice of selecting the best run criterion/criteria of the plant or mill. Thus, only that part of equation (47) corresponding to the user selected criterion/criteria will be executed to provide the optimal solution. For example, that user may select to optimize the quantity of sugar to be sold to market on day d ($qs_d^m$), the quantity of bagasse to be sold to market on day d ($qb_d^m$), and the quantity of type A molasses to be sold to market on day d ($qam_d^m$). The user makes this selection at 80 of the program shown in FIG. 4. Accordingly, only the following part of equation (47) is used:

$$\max OBJ = \sum_d ((PS_d)(qs_d^m) + (PB_d)(qb_d^m)) + \sum_d (PAM_d)(qam_d^m)$$

At 82, the program 78 will determine the constraints that influence the criterion/criteria selected at 80. In the example above, the program at 82 determines the constraints as given by Equations 1-6, 7, 8, 11, 14, 20, 21, 37, 38, and 41 as well as the following constraints:

$fpj_d=1 \forall d$ $fsj_d=1 \forall d$ $qam_d^e=0 \forall d$ $qb_d^e=0 \forall d$ $qb_d^{el}=0 \forall d$ The user will supply input data and parameters related to the criterion/criteria selected at 80, and at 84 the program 78 fetches these inputs and parameters related to the constraints determined at 82.

At 86, the program 78 determines the optimal outputs with respect to the criterion/criteria selected at 80. Further to the above example, the program 78 at 80 determines the optimized quantity of sugar to be sold to market on day d ($qs_d^m$), the optimized quantity of bagasse to be sold to market on day d ($qb_d^m$), and the optimized quantity of type A molasses to be sold to market on day d ($qam_d^m$). These optimized quantities are also displayed to the user at 86.

If the user changes the criterion/criteria as determined at 88, the new criterion/criteria are selected by the user at 90, and program flow returns to 82 to re-run the program 78.

Accordingly, the user is assisted in simulating different what-if scenarios.

Figure 5:
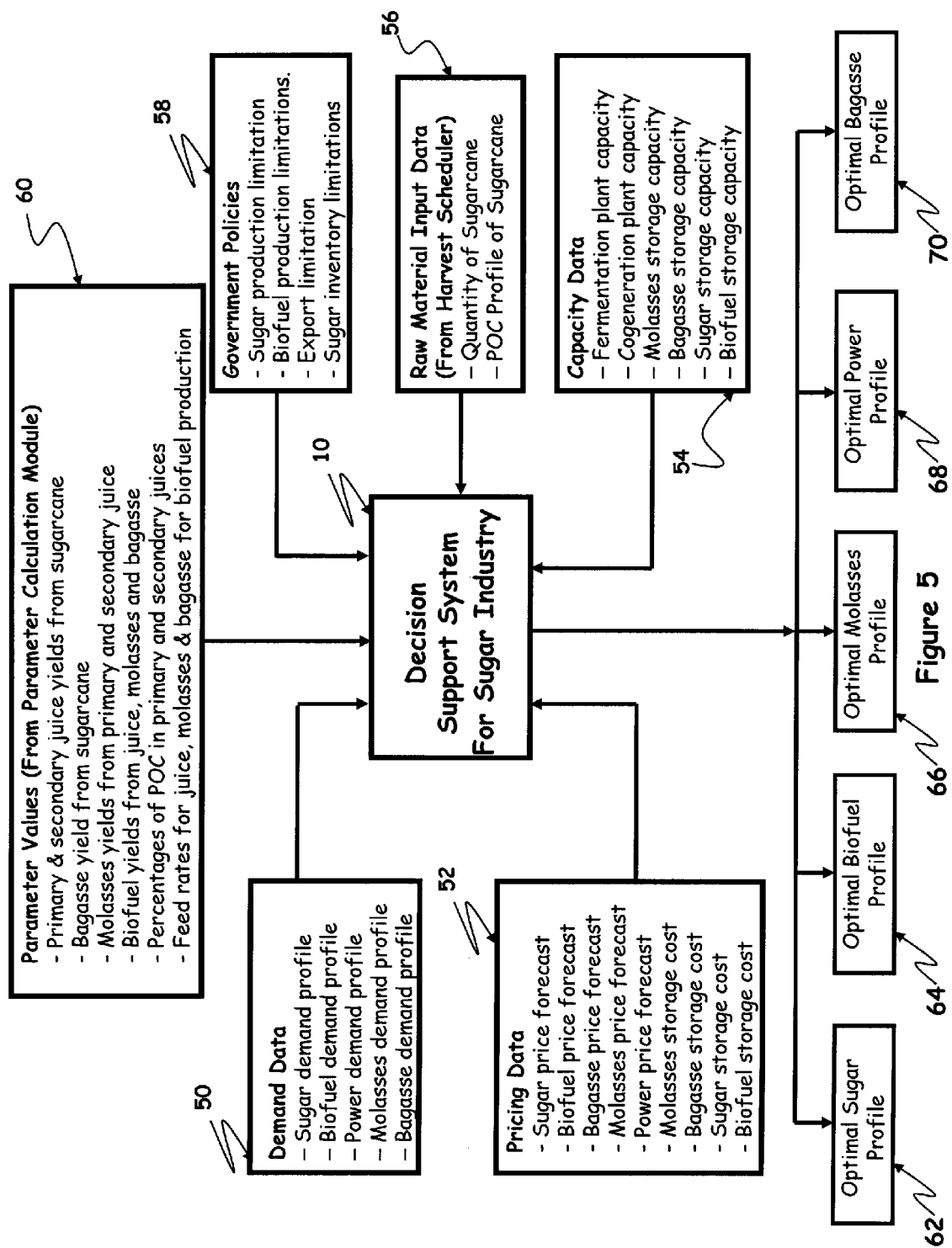

FIG. 5 shows the input information that is required by the process 10 with the sugar industry as an example case. This input information includes demand data 50. The demand data 50 includes the sugar demand profile $DES_d$, the molasses demand profiles $DEAM_d$, $DEBM_d$, and $DECM_d$, the bagasse demand profile $DEB_d$, the bio-fuel demand profiles such as $DEIGE_d$ and $DEFGE_d$, and the power demand profile $DEEL_d$.

This input information also includes pricing data 52. The pricing data 52 includes the forecasted sugar price, the forecasted bio-fuel price, the forecasted bagasse price, the forecasted molasses price, the forecasted power price, the forecasted molasses storage cost, the forecasted bagasse storage cost, the forecasted sugar storage cost, and the forecasted bio-fuel storage cost.

The input information additionally includes capacity data 54. The capacity data 54 includes fermentation plant capacity PCDP, cogeneration plant capacities PCCP, molasses storage capacities $STCAM_d$, $STCBM_d$, and $STCCM_d$, bagasse storage capacity $STCB_d$, sugar storage capacity $STCS_d$, and bio-fuel storage capacities $STCIGE_d$ and $STCFGE_d$.

This input information also includes raw material data 56. The raw material data 56 includes the quantity of sugarcane to be crushed ($QC_d^c$), and the POC (pure obtainable sugar) in the sugarcane to be crushed.

The input information further includes limitations 58 imposed by the policies of any relevant governments. The limitations 58 includes sugar production limitations, bio-fuel production limitations, export limitations, and sugar inventory limitations. The constraints related to government mandates can be easily added by those skilled in the art.

The input information also includes parameter values 60. The parameter values 60 include primary and secondary juice yields $PJC_d$ and $PSC_d$, bagasse yield $BC_d$, molasses yields from primary and secondary juices $AMPJ_d$, $AMSJ_d$, $BMPJ_d$, $BMSJ_d$, $CMPJ_d$, and $CMSJ_d$, bio-fuel yields from juice, molasses, and bagasse such as EPJ, ESJ, EAM, EBM, ECM, EB, and FGEIGE, percentages of POC in primary and secondary juices represented by $PJSF_d$ and $SJSF_d$, and feed rates for juice, molasses, and bagasse for bio-fuel production such as FRPJ, FRSJ, FRAM, FRBM, FRCM, and FRB.

The input data include any other parameters as described herein or otherwise.

The block 20 of FIG. 1 is also represented by the blocks 62, 64, 66, 68, and 70 of FIG. 5. As shown in FIG. 5, the block 62 provides the optimized sugar profiles which include production and sale of sugar on day d, the block 64 provides the optimized bio-fuel profiles which include production and sale of industry and fuel grade bio-fuel on day d, the block 66 provides the optimized molasses (A, B, and C) profiles which include production, utilization, and sale of different (A, B and C) molasses on day d, the block 68 provides the optimized power that is sold to market on day d, and the block 70 provides the optimized bagasse profile which includes production, utilization, and sale of bagasse on day d.

Certain modifications of the present invention have been discussed above. Other modifications of the present invention will occur to those practicing in the art of the present invention. For example, the present invention has been described above in connection with sugarcane, sugar beet, and sugar related products. However, the present invention could be used in connection with other crops where one of the product is bio-fuel and/or energy. Typical examples of such other crops include wheat, sweet sorghum, corn, etc.

As another example, the objective function of equation (47) might rely on fewer products and therefore fewer storage requirements for those fewer products.

The framework described herein can be used to obtain decisions as to how to best run a mill by taking into consideration known data/information. There are three aspects to this framework: 1) the known data or information; 2) the best run of the mill (based on some criteria); and, 3) decisions such as the output 20.

The known data/information includes, but is not limited to, a) the constraints related to mill capacities, b) pricing information of the products and raw materials, c) government mandates related to products and emissions, d) demand targets of products, and e) the energy requirement for product production.

The best run of the mill is based on maximization or minimization of any combination of the following criteria but is not limited to: a) product quantities to market; b) product revenue; c) carbon credits; d) storage cost of products; e) storage quantities of products; and, f) energy generated using products The decisions (outputs) to achieve the best run can be, but are not limited to, a) quantities of products produced and/or sold in market; b) storage quantities of products; c) quantity of energy and/or electricity produced using products; and, d) quantity of electricity to be imported/exported.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A computer implemented method for optimizing production of products in a product portfolio of a crop industry comprising:
   computer receiving user selected variables for products to be produced for the crop industry product portfolio to be optimized;
   computer determining constraints relating to the products to be produced for the crop industry product portfolio to be optimized and to the variables selected by the user;
   computer fetching input parameters related to the determined constraints and to an objective function to be optimized; and,
   computer optimizing quantities of the products to be produced and supplied to market based on the constraints and the objective function, wherein the objective function includes terms related to the parameters and the user selected variables.

2. The method of claim 1 wherein the optimizing of quantities comprises maximizing the objective function.

3. The method of claim 1 wherein the variables include quantity terms and an energy term, wherein the quantity terms relate to the quantities of the products to be optimized, and wherein the energy term includes an amount of energy required to produce the products.

4. The method of claim 3 wherein the energy in the energy term also includes an amount of energy produced from the products.

5. The method of claim 1 wherein the variables include quantity terms and storage terms, wherein the quantity terms relate to the quantities of the products to be optimized, and wherein the storage terms includes storage costs for storing the products that are produced but not supplied to market.

6. The method of claim 1 wherein the variables include quantity terms and a carbon credit term, wherein the quantity terms relate to the quantities of the products to be optimized, and wherein the carbon credit term relates to carbon credits realizable from production of electricity from the products.

7. The method of claim 6 wherein the carbon credit term further relates to fossil fuels required to produce the products.

8. The method of claim 1 wherein the variables include quantity terms, an energy term, and storage terms, wherein the quantity terms relate to the quantities of the products to be optimized, wherein the energy term includes an amount of energy required to produce the products, and wherein the storage terms includes storage costs for storing the products that are produced but not supplied to market.

9. The method of claim 8 wherein the energy in the energy term also includes an amount of energy produced from the products.

10. The method of claim 1 wherein the variables include quantity terms, an energy term, and a carbon credit term, wherein the quantity terms relate to the quantities of the products to be optimized, wherein the energy term includes an amount of energy required to produce the products, and wherein the carbon credit term relates to carbon credits realizable from production of electricity from the products.

11. The method of claim 10 wherein the energy in the energy term also includes an amount of energy produced from the products, and wherein the carbon credit term further relates to fossil fuels required to product the products.

12. The method of claim 1 wherein the variables include quantity terms, storage terms, and a carbon credit term, wherein the quantity terms relate to the quantities of the products to be optimized, wherein the storage terms include storage costs for storing the products that are produced but not supplied to market, and wherein the carbon credit term relates to carbon credits realizable from production of electricity from the products.

13. The method of claim 12 wherein the carbon credit term further relates to fossil fuels required to product the products.

14. The method of claim 1 wherein the variables include quantity terms, an energy term, storage terms, and a carbon credit term, wherein the quantity terms relate to the quantities of the products to be optimized, wherein the energy term includes an amount of energy required to produce the products, wherein the storage terms include storage costs for storing the products that are produced but not supplied to market, and wherein the carbon credit term relates to carbon credits realizable from production of electricity from the products.

15. The method of claim 14 wherein the energy in the energy term also includes an amount of energy produced from the products, and wherein the carbon credit term further relates to fossil fuels required to product the products.

16. The method of claim 1 wherein the products include sugar.

17. The method of claim 16 wherein the products further include electricity.

18. The method of claim 16 wherein the products further include bio-fuel.

19. The method of claim 18 wherein the bio-fuel includes industry grade bio-fuel and fuel grade bio-fuel.

20. The method of claim 16 wherein the products further include carbon credits.

21. The method of claim 16 wherein the products further include molasses.

22. The method of claim 21 wherein the molasses include type A molasses, type B molasses, and type C molasses.

23. The method of claim 16 wherein the products further include bagasse.

24. The method of claim 1 wherein the variables include quantity terms, wherein the quantity terms are based on the quantities of the products to be optimized, and wherein the quantity terms include corresponding market supply prices for the products.

25. The method of claim 1 wherein the optimizing of quantities includes providing decisions as to the products.

26. The method of claim 25 wherein the decisions include decisions on quantities of the products produced, sold, and/or stored, quantities of energy produced, and/or quantities of energy to imported and/or exported.

27. The method of claim 1 wherein the constraints include pricing information, government mandates, demand profiles, plant capacity limitation, and/or energy requirements.

28. The method of claim 1 wherein the optimized quantities include product revenue, carbon credits, storage costs, stored quantities, and/or generated energy.

29. The method of claim 1 wherein the optimizing of quantities comprises iteratively solving the objective function.

30. The method of claim 1 wherein the crop industry is such that one of the products includes a bio-fuel or a bio-energy.

31. The method of claim 30 wherein the biofuel includes bio-ethanol, bio-butanol, bio-hydrogen, bio-gas, bio-diesel, green diesel, and/or any combination thereof.

32. The method of claim 30 wherein the bio-energy includes thermal energy, mechanical energy, electrical energy, and/or any combination thereof.

* * * * *